(12) United States Patent
Hollander (10) Patent No.: US 7,091,450 B1
(45) Date of Patent: Aug. 15, 2006

(54) TWO-CIRCUIT GRIP HEATER

(76) Inventor: James M. Hollander, 166 Methodist Hill Rd., Plainfield, NH (US) 03781

( * ) Notice: Subject to any disclaimer, the term of this patent is extended or adjusted under 35 U.S.C. 154(b) by 0 days.

(21) Appl. No.: 10/905,941

(22) Filed: Jan. 27, 2005

(51) Int. Cl.
*B60L 1/02* (2006.01)

(52) U.S. Cl. ................ 219/202; 219/204; 219/476; 219/533; 219/535; 392/479; 392/500; 392/503

(58) Field of Classification Search .............. 219/204, 219/476–480, 533, 503, 535, 537, 539, 541, 219/546, 548; 392/465, 478, 473, 479, 483, 392/480, 503, 500; 338/62, 63, 295, 299, 338/302, 303
See application file for complete search history.

(56) References Cited

U.S. PATENT DOCUMENTS

| | | | |
|---|---|---|---|
| 4,471,209 A | | 9/1984 | Hollander |
| 4,937,429 A | | 6/1990 | Hollander |
| 4,990,753 A | | 2/1991 | Hollander |
| 5,586,214 A | * | 12/1996 | Eckman ................ 392/503 |
| 6,686,572 B1 | * | 2/2004 | Wu ................... 219/533 |
| 6,844,524 B1 | * | 1/2005 | Downey et al. ......... 219/204 |
| 2003/0056618 A1 | | 3/2003 | Dzurnak |

OTHER PUBLICATIONS

Automatic Distributers 1998 Winter Catalog, 1998, front cover and p. 55.
Parts Unlimited 1998 Snow Catalog, 1998, digital photographs of front cover and a portion of p. 90.
Instruction Sheet for Polly Heaters Hi-Lo Range Heater Kit, Polly Heaters Inc., Franklin Park, IL (2 sides).

* cited by examiner

*Primary Examiner*—Robin Evans
*Assistant Examiner*—Leonid M. Fastovsky
(74) *Attorney, Agent, or Firm*—Michael J. Weins; Jeffrey E. Semprebon (57) ABSTRACT

A grip heater has a tubular insulator that is designed to slip over a handlebar and has two interposed pairs of helical recesses. Each pair of helical recesses is formed by two parallel helical grooves and accommodates a heating element; the heating elements can have different resistances to provide differing degrees of heat when selectively connected to a voltage source. Preferably, the pairs of recesses overlap such that the heating elements reside in alternating grooves and cross over each other. The heating elements can be connected to a common ground to allow replacement of existing three-wire grip heaters. When a common ground is employed, the heating elements are preferably isolated where they cross.

19 Claims, 6 Drawing Sheets

TWO-CIRCUIT GRIP HEATER

BACKGROUND OF THE INVENTION

Grip heaters are employed to heat the hand grips of motorcycles, snowmobiles, and similar equipment which are operated in cold weather but which require sufficient dexterity on the part of the user to make the wearing of bulky mittens or gloves impractical. Such grip heaters are particularly beneficial in alleviating the effect of wind chill, especially when used on vehicle handgrips. These grip heaters have an electrical heating element which is embedded in the handgrip and is powered by a voltage supply of the equipment, such as a battery or a magneto. Examples of such grip heaters are taught in U.S. Pat. Nos. 4,471,209; 4,937,429; and 4,990,753 of the present inventor. These grip heaters have a single heating element of resistive wire wrapped over a tubular insulator having a pair of helical recesses in which the heating element resides. This structure is subsequently covered with a soft grippable material such as rubber to form a composite grip; the helical recesses serve to maintain the heating element in place as the soft grippable material is molded onto the wire-wound insulator. When an electrical current is passed through the wire of the composite grip, the grip is heated.

Since equipment with grip heaters are typically operated under a wide range of temperature and operating conditions, there is frequently a desire to adjust the amount of heat provided, such as providing both a low heat setting and a high heat setting. One approach to providing different degrees of heating is to provide two different heating elements in the handgrip, each element generating a different amount of heat when powered by the equipment battery. This has been achieved through the use of heating elements fabricated with printed circuits, where a pattern of conductors can be printed so as to form two interleaved but electrically isolated circuits on a substrate, which is then formed into a tube and incorporated into a grip. The printed circuits maintain reasonable grip thickness since the conductors are thin and flat; however, these conductors tend to break down at one or more locations along the conduction during use. These breakdowns may result from damage to the printed circuits due, in part, to mechanical straining of the circuit by the user applying force or torque to the grip to maneuver the device to which it is attached. The mechanical strains introduce irregularities which in turn causes the temperature to spike, causing local deterioration of the circuit and ultimately failure; this limits the useful life of such devices. Two additional problems that have been found in printed circuit grip heaters are delamination and heat loss. Over time, the circuit substrate delaminates from the underlying structure, apparently due to thermal degradation of the laminating adhesive, again reducing the life of the grip. The printed circuit also results in excessive heat loss since it resides in close proximity to a metal handlebar and employs flat conductors wrapped around the handlebar, which will increase heat radiation toward the handlebar.

U.S. Pat. No. 6,686,572 teaches a grip heater having two heat levels which does not require the use of printed circuits. The '572 patent teaches a heated handle having a tubular insulator with two interposed helical coils wound thereon, the coils having different heating efficiencies. The coils reside in a pair of parallel helical recesses in the tubular insulator and are subsequently covered with a rubber jacket to form the handle. The '572 patent does not disclose how the individual heating coils are connected to form a circuit, thus raising the issue of whether the '572 patent provides an enabling disclosure. However, while not taught in the '572 patent, it appears that a circuit could be formed if each of the coils is connected to a metal handlebar which in turn is connected to the ground terminal of the battery. In fact, this approach has been commercially used in dual-coil heated handgrips offered by Polly Heaters, Inc. of Franklin Park, Ill., at least as early as 1998. The Polly Heaters handgrips employ two heating elements that are connected to a switch for power from the equipment battery at one end of the handgrip and connected to a central metal sleeve at the other end, which provides a ground through the metal handlebar of the equipment. The switch allows either of the heating elements to be energized, to provide either a low or high heat output. A limitation of such grip heaters is that they depend on the central metal sleeve and metal handlebar to complete the electrical circuit, and thus cannot be used on equipment which has handlebars that are electrically insulated from the battery. Additionally, the metal sleeve tends to act as a heat sink, drawing heat towards the metal handlebars.

An alternative approach to provide a grip with a variable heat output is to control the amount of heat generated by a single heating element. This has been achieved either by limiting the electrical voltage available to the heating element or by varying the amount of time that the heating element receives power. Limiting the voltage available to the heating element, so as to provide a low heat setting, is accomplished by a resistor and a switch. When the switch is in its low heat position, the resistor is in series with the heating element, and when the switch is in the high heat position, it bypasses the resistor. The inclusion of a resistor complicates the wiring and results in wasted electrical power output. Furthermore, the resistor must be fairly large to dissipate a large amount of energy and must be mounted in an exposed location to allow the heat to be dissipated, complicating installation of the grip heater. Controlling the amount of time that the heating element is energized is typically achieved by use of a Pulse Width Modulator, where the electrical current is rapidly pulsed on and off, with the proportion of time on determining how much heat is provided. This approach requires complicated circuitry to switch the current on and off.

Thus, there is a need for a grip heater that allows selecting between high and low heat output while avoiding the disadvantages of the prior art.

SUMMARY OF THE INVENTION

The grip heater of the present invention has a tubular insulator having a central region terminating in a base end region and a distal end region. The tubular insulator is designed to slip over a handlebar, the handlebar being inserted at the base end region. The distal end region may be closed so as to provide a stop against which the handlebar may rest when fully inserted into the tubular insulator.

The tubular insulator has a first pair of helical recesses and a second pair of helical recesses that is interposed between the first pair of helical recesses. Each pair of helical recesses traverses the central region and extends into the end regions of the tubular insulator. The first pair of helical recesses is formed by a first helical groove and a second helical groove which are substantially parallel to each other, while the second pair of helical recesses is formed by a third helical groove and a fourth helical groove which are substantially parallel to each other and to the first and second helical grooves. The resulting helical grooves can be arranged in two distinct patterns. A first pattern has the helical recesses interposed in a pair-wise manner, in which case the first groove and the second groove will have a side-by-side relationship, as will the third groove and the fourth groove. In this configuration, the pairs of helical recesses will not overlap. A second pattern has the second pair of helical recesses individually interposed between the first pair of helical recesses such that the recesses of the pairs alternate as the length of the grip is traversed. In this configuration, the pairs of helical recesses will overlap, in which case the first and third grooves and the second and fourth grooves will have a side-by-side relationship.

In either case, a first heating element resides in the first pair of helical recesses along the central region of the tubular insulator. The first heating element terminates in a first element first end and a first element second end, both of which are located in close proximity to the base end region of the tubular insulator to allow connecting the first heating element to an electrical energy source so as to form a complete circuit. Means for transferring the first heating element from the first helical groove to the second helical groove in close proximity to the distal end region of the tubular insulator are provided. This means for transferring the first heating element allows the first heating element to have its first element first end in close proximity to the base region of the tubular insulator and run along the first helical groove towards the distal end region of the tubular insulator, cross over in the distal end region to the second helical groove, and return along the second helical groove back towards the base end region of the tubular insulator so that the first element second end will be in close proximity to the base end region of the tubular insulator. When the first heating element is positioned as discussed above, the first heating element can be readily connected via the first element ends to a voltage source, such as a battery, to form a complete circuit for energizing the first heating element to generate heat.

Similarly, a second heating element is provided, which resides in the second pair of helical recesses along the central region of the tubular insulator, and which terminates in a second element first end and a second element second end, both located in close proximity to the base end region of the tubular insulator. Means for transferring the second heating element from the third helical groove to the fourth helical groove in close proximity to the distal end region of the tubular insulator are provided and provide a similar function for the second heating element as the means for transferring the first heating element. Again, when the second heating element is so positioned, it can be readily connected to the voltage source to provide heating since the second element ends will be conveniently located at or near the base end region of the tubular insulator.

While either pattern of grooves can be employed, if the first pattern is employed where the pairs of helical recesses do not overlap, the recesses need to be closely spaced apart to avoid unheated regions of significant length when only one of the heating elements is activated, since there is a pair of grooves containing an unheated element between each pair of grooves containing the heated elements. However, if the grooves are closely spaced apart to reduce the length of each of these unheated regions, heating along the grip will be intensified in the region between the grooves in which the heated element resides, resulting in overheating which may result in degradation of the grip over time. For this reason, it is preferred that a second pattern of grooves be employed, where the pairs of helical recesses overlap.

When the second pair of helical recesses are interposed between the first pair of helical recesses such that the grooves of the helical recesses alternate along the length of the grip (the overlapping helical relationship), the spacing between the grooves can be increased, since either the first heating element or the second heating element can be energized without creating unheated regions of significant length which could create uncomfortable cold spots. Furthermore, if one of the heating elements is energized, there will be a non-energized coil between each of the coils of the energized heating element, which will provide a region in which excess heat can be dissipated. While the overlapping relationship of the helical recesses offers many benefits, this pattern of grooves requires the first heating element and the second heating element to cross each other in the region where one of the heating elements crosses over from one helical groove to another. In the event that the two heating elements are independently powered, this crossover does not create a problem. However, if the heating elements share electrical contacts to the power source, such as a common ground connection, then it is generally preferred to maintain electrical isolation of the two heating elements where they cross. This will require that, in addition to the means for transferring the first heating element and the means for transferring the second heating element, there will need to be means for isolating the heating elements. This isolation can be provided by protrusions and/or grooves on the tubular insulator, which can also aid in maintaining each heating element in tension as it is wrapped into the helical grooves in which it is to reside. An alternative means is to place an insulating material between the heating elements where they cross.

It is also preferred to provide means for anchoring the heating elements in the base end region of the tubular insulator, to which the heating elements can be physically secured to maintain the heating elements in place when a soft grippable material is applied over the tubular insulator and the heating elements so as to form a heated grip. Protrusions configured to secure the heating elements can serve as the means for anchoring the heating elements; examples of such protrusions include posts about which the heating elements is wrapped or jam cleats into which the heating element wire is forced. Alternative anchor means could include grooves or notches into which the heating element wire is forced, indents into which the heating element wire is pushed and then secured with a tight-fitting plug, pins bracketing the heating wire and subsequently deformed to entrap the wire, or similar means known in the art for securing a wire to a plastic structure.

To provide different heat outputs, it is preferred that a switch be provided which selectively energizes only one of the heating elements to provide a high heat output and a low heat output, and that the two heating elements each have a different resistance such that, when connected to a particular voltage, one will result in a greater electrical current and consequently more heat being generated. The switch allows a voltage source to be selectively connected to either one or the other of the heating elements. The switch preferably also includes a neutral position where neither heating element is connected, for operation when no heat is desired.

To simplify the circuitry and to provide a grip which is suitable to retrofit many of the conventional circuits in service, it is preferred for the heating elements to be connected together at their unswitched ends to provide a common ground. As discussed above, if such is done, it is preferred to provide not only means for transferring the first heating element and the means for transferring the second heating element, but also provide means to prevent contact between the first heating element and the second heating element at the crossover points on the tubular insulator.

BRIEF DESCRIPTION OF THE FIGURES

FIGS. 3 through 6 are isometric views illustrating a grip heater which forms another embodiment of the present invention. FIG. 3 illustrates a tubular insulator which forms part of the grip heater, and which can be slid onto a handlebar (a portion of which is shown). The tubular insulator has two pairs of helical recesses to accommodate a first heating element and a second heating element (shown in FIGS. 4–6). After the heating elements are installed, the grip heater can be covered with a soft, grippable material (as indicated in phantom in FIG. 3), so as to form a heated handgrip for the handlebar.

FIG. 4 is an isometric view of the tubular insulator of FIG. 3 with the first heating element wound thereon. The second heating element is removed to better illustrate the second pair of helical recesses, which is formed by a third helical groove and a fourth helical groove. Also better shown in FIG. 4 is how a pair of second element crossover protrusions is positioned with respect to the first heating element. Each of the second element crossover protrusions has a notch that engages the second heating element to restrain it in position where it crosses from the third helical groove to the fourth helical groove, the notches being placed so as to position the second heating element at a sufficient radial separation from the tubular insulator so as to prevent contact between the first heating element and the second heating element.

FIG. 5 also better illustrates a first element crossover protrusion which has a notch that engages the first heating element to restrain it in position where it crosses from the first helical groove to the second helical groove.

FIG. 7 is a partial isometric view illustrating a portion of a grip heater which forms another embodiment of the present invention. This embodiment differs from that shown in FIGS. 3–6 in the means for transferring the first heating element from the first helical groove to the second helical groove and the means for transferring the second heating element from the third helical groove to the fourth helical groove. In this embodiment, these means are provided by crossover protrusions in the form of posts about which the heating elements can be wrapped. The posts of the second element crossover protrusions are mounted on pedestals so as to space the second heating element a sufficient distance from the tubular insulator so as to prevent contact between the first heating element and the second heating element.

FIG. 11 is a partial isometric view of a heated grip which forms another embodiment of the present invention. The tubular insulator of this embodiment is provided with distal end region lugs that extend substantially normal to a longitudinal axis of the tubular insulator. These lugs serve a dual function. They serve to secure the tubular insulator in the grip without relying solely on the adhesion between the tubular insulator and a pliable covering which covers the tubular insulator. The distal end region lugs are also provided with indents through which the heating elements pass when transferring between grooves. In this embodiment, the depths of the indents are maintained such that the heating elements will pass over each other without making contact.

DETAILED DESCRIPTION OF THE PREFERRED EMBODIMENTS

Figure 1:
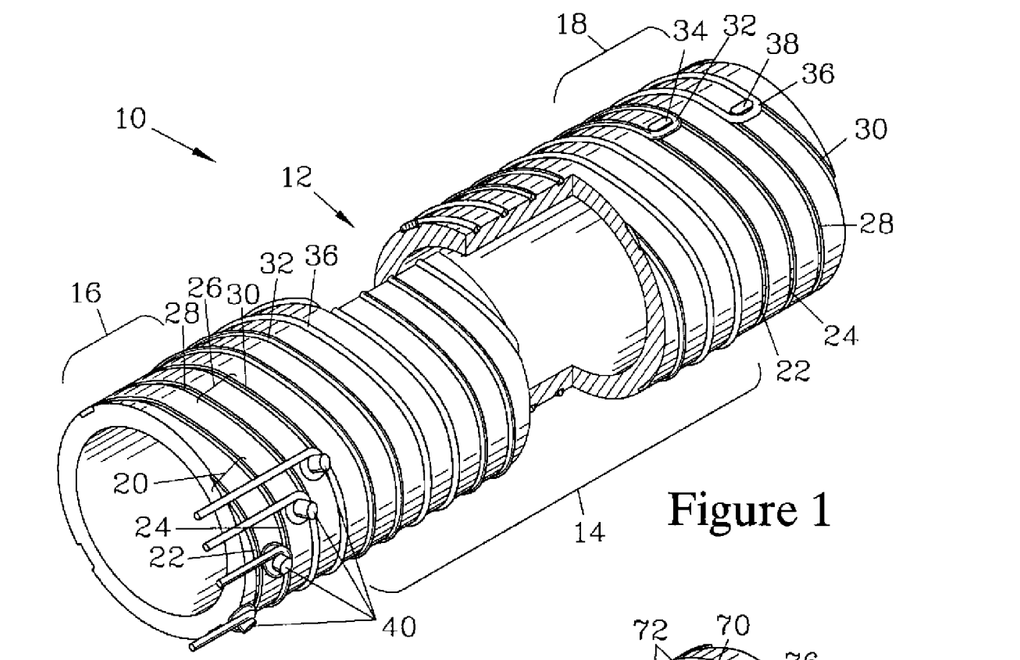
FIGS. 1 and 2 are isometric views of two embodiments of grip heaters of the present invention, each formed by a tubular insulator which is wound with heating elements. In both embodiments, the tubular insulator has two pairs of helical recesses that traverse the tubular insulator and are spaced apart. One groove of each pair is used to hold windings of a heating element as it advances on a path from a base end region of the tubular insulator to a distal end region, defined as forward windings, while the other groove of each pair is used to hold windings of the heating element as it returns on a path from the distal end region to the base end region, defined as return windings. While the spacing between adjacent grooves is the same in the two embodiments, the means for transferring the heating elements between recesses differ. In the embodiment shown in FIG. 1, the means for transferring the heating elements between grooves are such that they transfer the heating elements between adjacent grooves, resulting in the separation between the forward windings and the return windings being small. In the embodiment shown in FIG. 2, the means for transferring the heating elements are such that the heating elements are transferred between alternating grooves, thereby increasing the separation between the forward windings and the return windings. In both embodiments, there are four base anchor posts to provide means for anchoring the heating elements in the base end region.

FIG. 1 is an isometric view of a grip heater 10 that includes a tubular insulator 12 having a central region 14 that terminates in a base end region 16 and a distal end region 18. The tubular insulator 12 has a first pair of recesses 20 which are formed by a first helical groove 22 and a second helical groove 24 which are spaced apart, parallel, and positioned in a side-by-side relationship. A second pair of recesses 26 are provided, which are formed by a third helical groove 28 and a fourth helical groove 30 which are also spaced apart, parallel and in a side-by-side relationship. In this embodiment, the two pairs of recesses (20, 26) are in a side-by-side relationship and do not overlap.

A first heating element 32 resides in the first helical groove 22 and the second helical groove 24 along the central region 14. The first heating element 32 traverses the first helical groove 22 from the base end region 16 and to the distal end region 18, where it passes around a distal end first post 34 which serves as means for transferring the first heating element 32 from the first helical groove 22 to the second helical groove 24 at the distal end region 18 of the tubular insulator 12. Thereafter, the first heating element 32 traverses the second helical groove 24 and returns to the base end region 16. When the first heating element 32 is maintained in tension in the helical grooves (22, 24), the distal end first post 34 also serves as means for securing the first heating element 32 in the distal end region 18.

A second heating element 36 resides in the third helical groove 28 and the fourth helical groove 30 along the central region 14. The second heating element 36 starts at the base end region 16, traverses the third helical groove 28 to the distal end region 18, and passes around a distal end second post 38 which serves as means for transferring the second heating element 36 from the third helical groove 28 to the fourth helical groove 30 at the distal end region 18 of the tubular insulator 12. Thereafter, the second heating element 36 traverses the fourth helical groove 30 and returns to the base end region 16. When the second heating element 36 is maintained in tension in the grooves (28, 30), the distal end second post 38 also serves as means for securing the second heating element 36 in the distal end region 18.

The first heating element 32 and the second heating element 36 are secured at the base end region 16 by anchor posts 40 about which they wrap. When either of the heating elements (32, 36) is energized, it will generate heat, warming the grip. However, when the tubular insulator 12 is configured and wrapped as shown in FIG. 1, where the pairs of recesses (20, 26) do not overlap, the heating elements (32, 36) run in side-by-side grooves (22, 24, and 28, 30). When one of the heating elements (32, 36) has current passing therethrough, it will generate heat; however, no heat will be generated in the region occupied by the other heating element. This can give rise to temperature variation along the grip unless the grooves (22, 24, 28, 30) are closely spaced. However, if the spacing is reduced, the local heating around the paired grooves through which current is flowing and, in particular between the pair of heated grooves, will be increased and may be increased to such a degree as to reach temperatures where the grip life is substantially reduced. Thus, while this configuration will function, its effectiveness may be limited.

Figure 2:
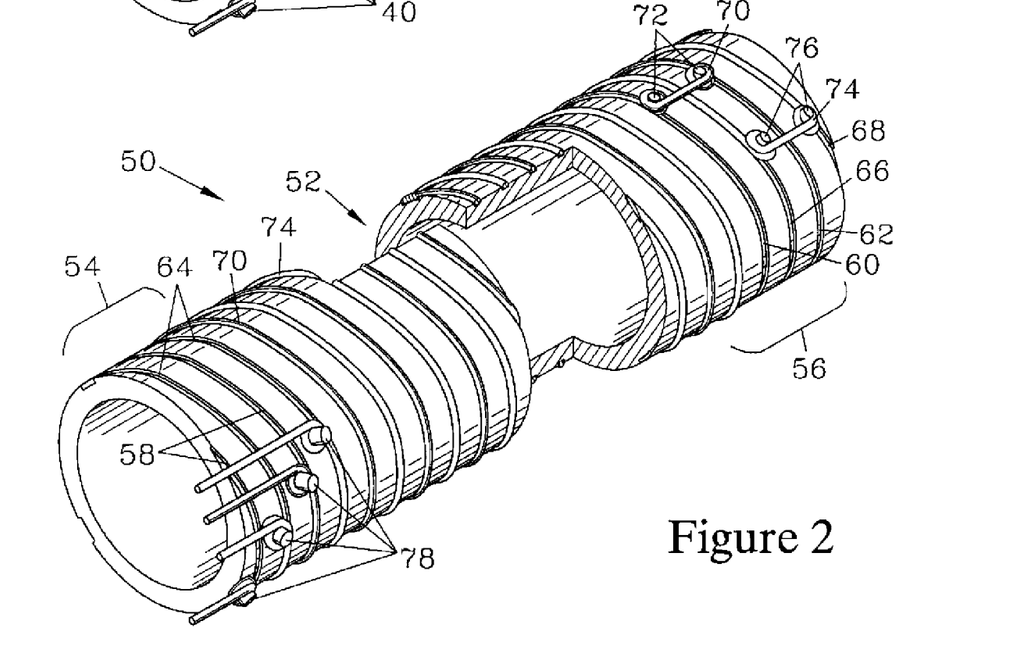

FIG. 2 is an isometric view of a grip heater 50 which shares many of the features of the heated grip 10 discussed above; however, this embodiment reduces the problems of temperature variation along the grip. The heated grip 50 has a tubular insulator 52 which again terminates in a base end region 54 and a distal end region 56. The tubular insulator 52 has a first pair of recesses 58, having a first groove 60 and a second groove 62, as well as a second pair of recesses 64, having a third groove 66 and a fourth groove 68. In this embodiment, the two pair of recesses (58, 64) are in an overlapping relationship rather than being in a side-by-side relationship. When a first heating element 70 transverses the first groove 60, it is transferred to the second groove 62 by a pair of first element transfer posts 72. These transfer posts 72 straddle the third groove 66. The first heating element 70 is wrapped around each of the first element transfer posts 72, thereby also serving to secure the first heating element 70 at the distal end region. Similarly, a second heating element 74 traverses the third groove 66 and passes under the first heating element 70 and then is transferred to the fourth groove 68 by wrapping about each of a pair of second element transfer posts 76. The second element transfer posts 76 are positioned to straddle the second groove 62 and also serve to secure the second heating element 74. Four base anchor posts 78 are provided for securing the heating elements (70, 74) in the base end region 54. Since each of the heating elements (70, 74) is independently powered in this embodiment, contact between the two heating elements (70, 74) where they cross will not affect the operation of the grip heater 50. The overlapping relationship between the heating elements (70, 74) as is employed in this embodiment is preferred over the isolated heating elements as shown in FIG. 1, since the spacing of the active heating element provides a more uniform heat along the length of the grip, reducing cold spots and the likelihood of thermal degradation of the grip.

While a four lead system has a benefit in that isolation of the two heating elements in not required, it is frequently desirable to provide a three-lead system, since such a grip will readily interface with many existing electrical systems used with heated hand grips.

FIGS. 3 through 6 illustrate a three-lead grip heater 100 which forms another embodiment of the present invention. The grip heater 100 is designed to form part of a handgrip 102 (the outline of which is shown in phantom in FIG. 3) that is installed onto a handlebar 104, only a part of which is shown. The grip heater 100 has a tubular insulator 106 which terminates in a base end region 108 and a distal end region 110. The tubular insulator 106 has a central opening 112 that is configured to slidably engage the handlebar 104.

The tubular insulator 100 is designed to be wound with heating elements in the same fashion as is the tubular insulator 50 illustrated in FIG. 2. The tubular insulator 100 has a first helical groove 114, and a second helical groove 116 which is substantially parallel to the first helical groove 114, both shown in FIGS. 3 and 5. The first helical groove 114 and the second helical groove 116 terminate in the end regions (108, 110) of the tubular insulator 100, and form a first pair of helical recesses. The tubular insulator 100 also has a third helical groove 118 and a fourth helical groove 120, both shown in FIGS. 3 and 4, which are substantially parallel to each other and to the first helical groove 114 and the second helical groove 116. Again, the third helical groove 118 and the fourth helical groove 120 terminate in the end regions (108, 110). The third helical groove 118 and the fourth helical groove 120 form a second pair of helical recesses, which is interposed between the first pair of helical recesses in an alternating manner, as better illustrated in FIGS. 4 and 5.

Figures 3, 4:
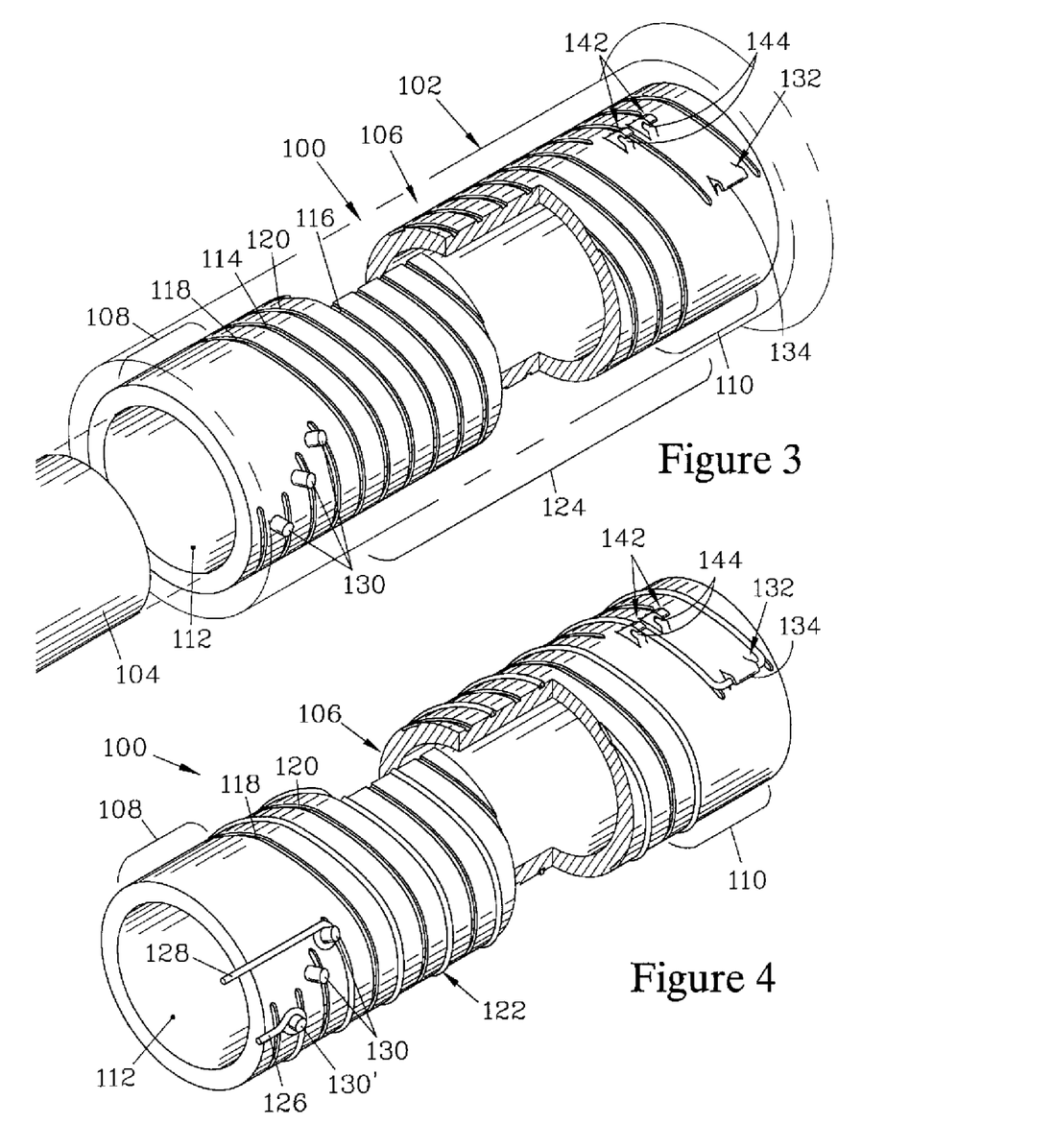
Figures 5, 6:
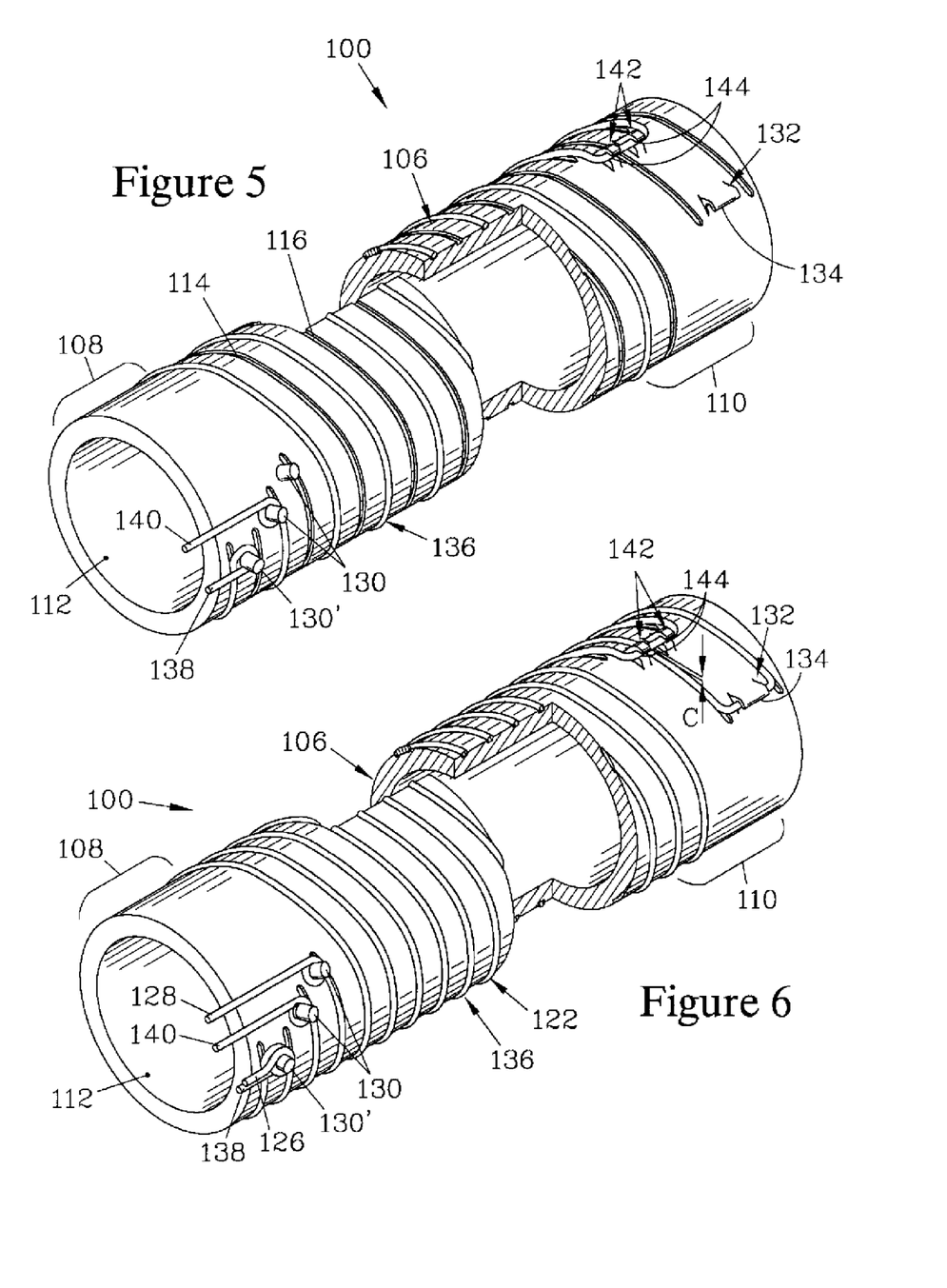
FIG. 5 is an isometric view of the tubular insulator and the second heating element, with the first heating element removed to better illustrate the first pair of helical recesses. The first pair of helical recesses are formed by a first helical groove and a second helical groove.
FIG. 6 is an isometric view of the completed grip heater, including the tubular insulator, the first heating element, and the second heating element. Heating element ends of the first heating element and the second heating element can be readily connected to a switch (not shown) and a power supply such as a battery to allow either the first heating element or the second heating element to be selectively energized. In this embodiment, the first heating element and the second heating element are connected together to form a common ground connection, making the grip heater particularly well suited for replacing an existing three-wire printed circuit type grip heater.

FIG. 4 is an isometric view of the tubular insulator 106 and a first heating element 122 which resides in the first helical groove 114 and the second helical groove 116 (which are shown in FIGS. 3 and 5) along a central region 124 of the tubular insulator 106 (shown in FIG. 3). The first heating element 122 terminates in a first element first end 126 and a first element second end 128 which are located in close proximity to the base end region 108. To maintain the first element ends (126, 128) in position, the base end region 108 is provided with anchor protrusions 130 to which the first heating element 122 is affixed. The anchor protrusions 130 illustrated are formed as posts about which the first heating element 122 is wrapped to affix it with respect to the base end region 108.

Means for transferring the first heating element 122 from the first helical groove 114 to the second helical groove 116 in close proximity to the distal end region 110 of the tubular insulator 106 are provided by a first element crossover protrusion 132. The first element crossover protrusion 132 protrudes from the tubular insulator 106 and has a first element protrusion notch 134 (better shown in FIGS. 3 and 5) that is sized to engage the first heating element 122 to affix the first heating element 122 with respect to the distal end region 110 as well as to maintain it in position where it can cross from the first helical groove 114 to the second helical groove 116. The first element crossover protrusion 132 is well suited to holding the first heating element 122 in place as it is wound around the tubular insulator 106 towards the base end region 108.

FIG. 5 is an isometric view of the tubular insulator 106 and a second heating element 136, with the first heating element 122 removed to better illustrate the first helical groove 114 and the second helical groove 116. The second heating element 136 resides in the third helical groove 118 and the fourth helical groove 120 (which are shown in FIGS. 3 and 4) along the central region 124 of the tubular insulator 106. The second heating element 136 terminates in a second element first end 138 and a second element second end 140, which are maintained in close proximity to the base end region 108 by wrapping the second heating element 136 around two of the anchor protrusions 130. In this embodiment, the first heating element 122 and the second heating element 136 are both wrapped around the anchor protrusion 130' (as shown in FIG. 6), which places the first element first end 126 and the second element first end 138 together to facilitate attaching them to a common ground.

Means for transferring the second heating element 136 from the third helical groove 118 to the fourth helical groove 120 in close proximity to the distal end region 110 of the tubular insulator 106 are provided by a pair of second element crossover protrusions 142. The second element crossover protrusions 142 protrude from the tubular insulator 106 and each has a second element protrusion notch 144 (better shown in FIGS. 3 and 4) that is sized to engage the second heating element 136 to restrain it in position where it crosses from the third helical groove 118 to the fourth helical groove 120. Additionally, the second element protrusion notches 144 are positioned to raise the portion of the second heating element 136 engaged therewith to an increased radial separation from the tubular insulator 106. This increased radial separation provides a clearance C (shown in FIG. 6) permitting the first heating element 122 to pass below the second heating element 136 without contact therebetween. Having the second element protrusion notches 144 so located serves as means for isolating the two heating elements (122, 136) as they cross over each other.

FIG. 6 is an isometric view more clearly showing the first heating element 122 and the second heating element 136 wound onto the tubular insulator 106. To complete the handgrip 102, a soft, grippable material such as a synthetic rubber is applied over the tubular insulator 106 onto which the heating elements (122, 136) have been wound. When the handgrip 102 is formed by molding, it is further preferred for the second element protrusion notches 144 to be configured to make the clearance C between the heating elements (122, 136) where they cross sufficiently large as to allow the soft grippable material to flow therebetween to provide a sufficient thickness of rubber material between the heating elements (122, 136) to assure isolation therebetween.

It is preferred for the heating elements (122, 136) to be configured such that they differ in resistance. This allows the heating elements (122, 136) to be individually energized to provide two different heat outputs. For example, the first heating element 122 might be fabricated of 0.025" diameter wire of an alloy having a resistance such that the overall resistance of the first heating element 122 is about 2.4 ohms, and the second heating element 136 might be fabricated of similarly sized wire of a different alloy having a resistance such that the overall resistance of the second heating element 136 is about 3.6 ohms. Since the resistance of the first heating element 122 is lower than that of the second heating element 136, a greater current will flow when the first heating element 122 is connected to a voltage source, such as a 12-volt or 6-volt equipment battery, than when the second heating element 136 is connected to the same voltage source. The greater current will result in greater heat generation. The heating elements (122, 136) could be connected to a switch such that they could both be energized at the same time, to provide a third heat setting; however, such would complicate the switching, since at least one of the heating elements (122, 136) would need to be isolated when operating singly and connected to the other when operating together. Furthermore, energizing both heating elements (122, 136) simultaneously may increase the likelihood of causing thermal degradation of the grip 102.

Figure 7:
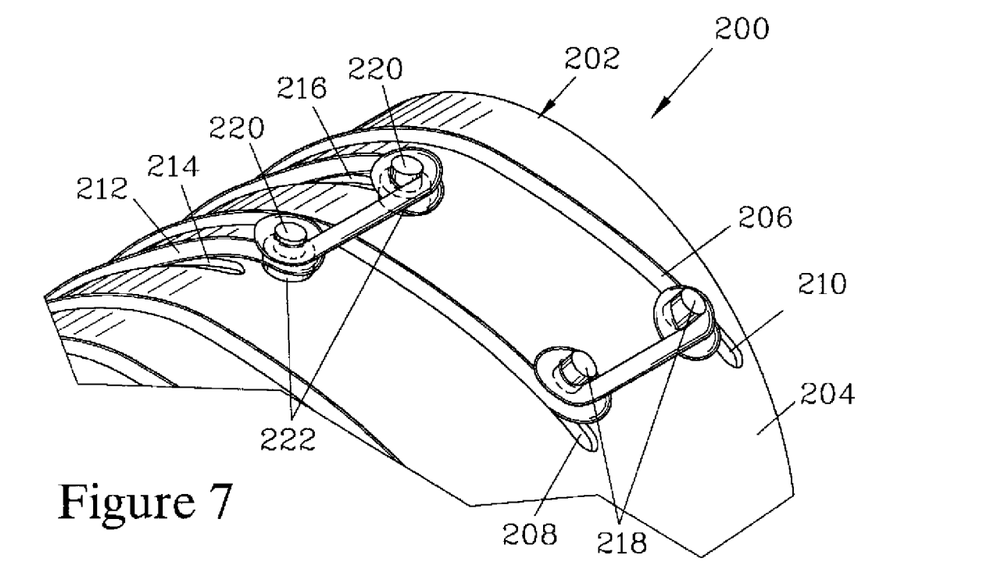

FIG. 7 is a partial isometric view of a grip heater 200 which forms another embodiment of the present invention. The grip heater 200 again has a tubular insulator 202 terminating at a distal end region 204, a first heating element 206 residing in a first helical groove 208 and a second helical groove 210, and a second heating element 212 residing within a third helical groove 214 and a fourth helical groove 216. In the grip heater 200, means for transferring the first heating element 206 from the first helical groove 208 to the second helical groove 210 are provided by a pair of first element transfer posts 218 about which the first heating element 206 can be wrapped to maintain it in position with respect to the distal end region 204. Similarly, means for transferring the second heating element 212 from the third helical groove 214 to the fourth helical groove 216 are provided by a pair of second element transfer posts 220 about which the second heating element 212 is wrapped. The second element transfer posts 220 are each mounted on a pedestal 222 on which the second heating element 212 rests, raising the second heating element 212 away from the tubular insulator 202 sufficiently to prevent contact where the second heating element 212 passes over the first heating element 206.

It should be noted that the helical grooves in which the heating elements reside could be formed deep enough at or near the distal end region 204 to allow crossover of the heating elements without contact; in which case, the pedestals 222 could be eliminated. However, such may be impractical if it is desired to maintain the overall radius of the grip relatively small and still maintain a relatively thick layer of soft, grippable material over the tubular insulator 200.

Figure 8:
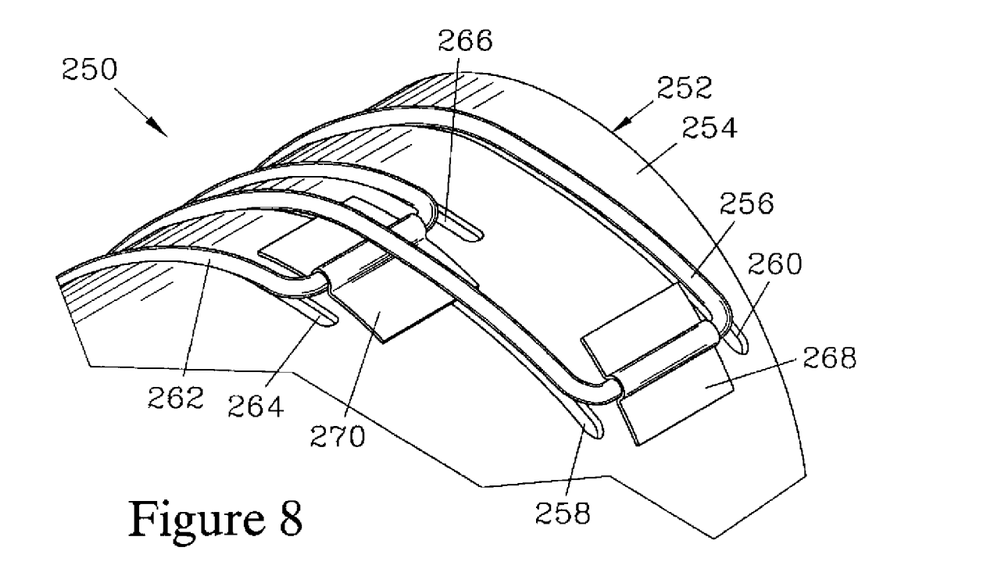
FIG. 8 is a partial isometric view illustrating a portion of a grip heater which forms yet another embodiment of the present invention, which again differs from the embodiments shown in FIGS. 3–7 in the means for transferring the first heating element from the first helical groove to the second helical groove and the means for transferring the second heating element from the third helical groove to the fourth helical groove. In this embodiment, these means are provided by strips of insulating tape which attach to the tubular insulator to retain the first heating element and the second heating element in position. The insulating properties of the tape serve to prevent electrical contact between the first heating element and the second heating element.

FIG. 8 is a partial isometric view of a grip heater 250 which forms yet another embodiment of the present invention. Again, the grip heater 250 has a tubular insulator 252 terminating at a distal end region 254, a first heating element 256 which resides in a first helical groove 258 and a second helical groove 260, and a second heating element 262 which resides within a third helical groove 264 and a fourth helical groove 266. In this embodiment, means for transferring the first heating element 256 from the first helical groove 258 to the second helical groove 260 are provided by a first strip of insulating tape 268 which attaches to the tubular insulator 252 to retain the first heating element 256 in position. Similarly, means for transferring the second heating element 262 from the third helical groove 264 to the fourth helical groove 266 are provided by a second strip of insulating tape 270 which attaches to the tubular insulator 252 to retain the second heating element 262 in position. The second strip of insulating tape 270 also covers the second heating element 262 at the location where the first heating element 256 passes thereover, and thus prevents contact between the first heating element 256 and the second heating element 262. Fiberglass tape having a thickness of about 0.01" is one example of a tape which might be effective for providing the strips of insulating tape (268, 270).

While insulating tape is shown in FIG. 8, it should be appreciated that isolation of the heating elements in a similar manner could be provided by strips of insulating material affixed to the tubular insulator, and preferably formed integrally therewith. The strips could each be configured to pass over the associated heating element and secure to the tubular insulator on the other side, such as by engaging a latch piece affixed to the tubular insulator. When such strips are employed, it is preferred for them to be affixed on the side towards which the heating elements are wound so that the affixed portions of the strips can provide tension as the heating elements are wound onto the tubular insulator.

Figure 9:
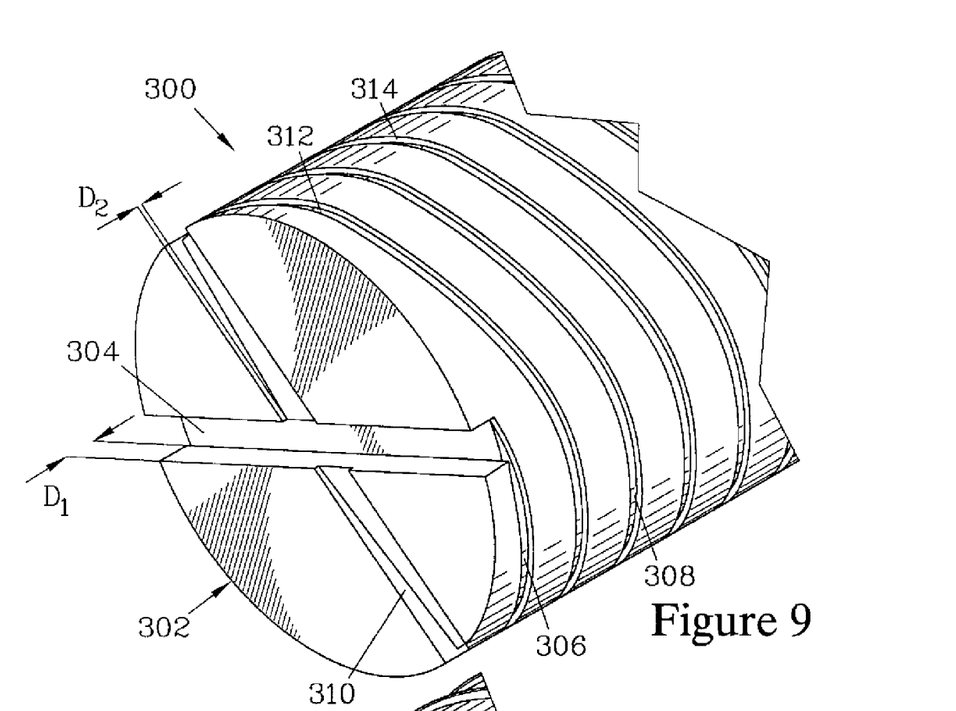
FIG. 9 is an isometric view illustrating a distal end region of a tubular insulator for a grip heater which employs another means for transferring the heating elements from and to selective helical grooves of the tubular insulator. In this embodiment, end grooves of differing depths are placed in the tubular insulator to allow the heating elements to change the helical groove in which they reside while retaining them in position. The end grooves have different depths, thereby preventing contact of the heating elements as they cross.

FIG. 9 is a partial isometric view illustrating a portion of a tubular insulator 300 of a grip heater which employs another means for transferring heating elements between their respective helical grooves. The tubular insulator 300 in this embodiment has a closed-ended distal end region 302. The distal end region 302 is provided with a distal end first notch 304 of depth $D_1$, which connects a first helical groove 306 to a second helical groove 308. The distal end region 302 also is provided with a distal end second notch 310, which connects a third helical groove 312 to a fourth helical groove 314. The distal end second notch 310 has a depth $D_2$ where it intersects the distal end first notch 304. The depths ($D_1$, $D_2$) of the distal end notches (304, 310) are such that $D_1-D_2$ is substantially greater than the thickness of a first heating element (not shown) which traverses the distal end first notch 304. This difference in depth serves to prevent contact between the first heating element and a second heating element, which traverses the distal end second notch 310. As configured, the distal end notches (304, 310) provide both means for transfer and means for isolation. They also serve to secure the heating elements in the distal end region 302 of the tubular insulator 300.

Figure 10:
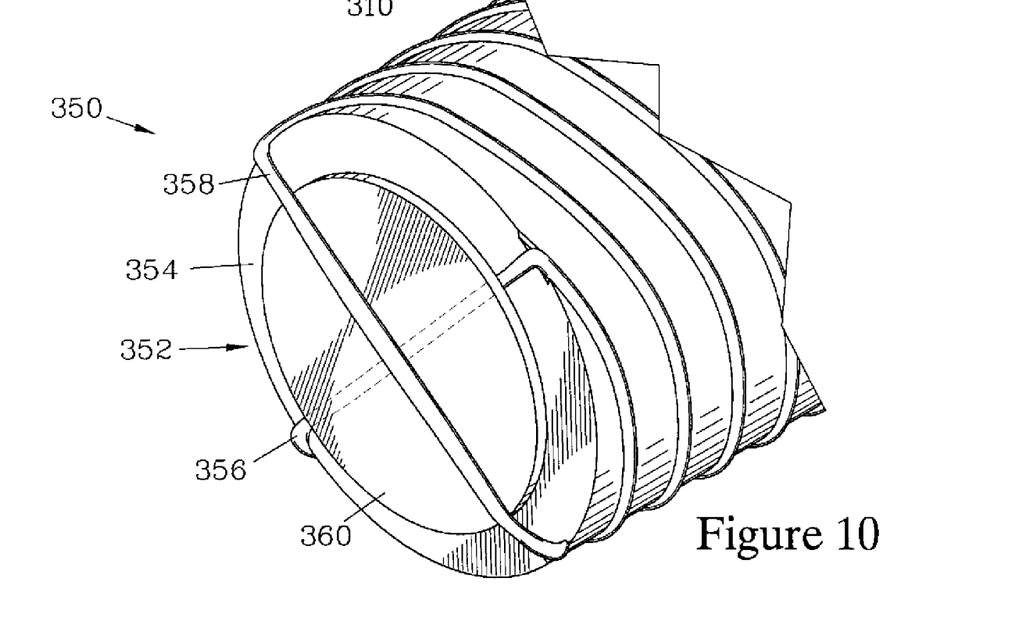
FIG. 10 is a partial isometric view of a grip heater where the transfer of the heating element is achieved by having the heating elements change grooves as they pass over the end of the tubular insulator. An insulating disk is placed between the heating elements to prevent contact therebetween as the elements pass over the end.

FIG. 10 is a partial isometric view showing a portion of a grip heater 350 having a tubular insulator 352 which again has a closed-ended distal end region 354. Again, the transfer of a first heating element 356 and a second heating element 358 is accomplished by having the heating elements (356, 358) pass over the closed end of the distal end region 354. After the first heating element 356 has been wound onto the tubular insulator 352, an insulating disk 360 is placed over the first heating element 356 to allow the second heating element 358 to cross thereover while preventing contact between the heating elements (356, 358).

Figure 11:
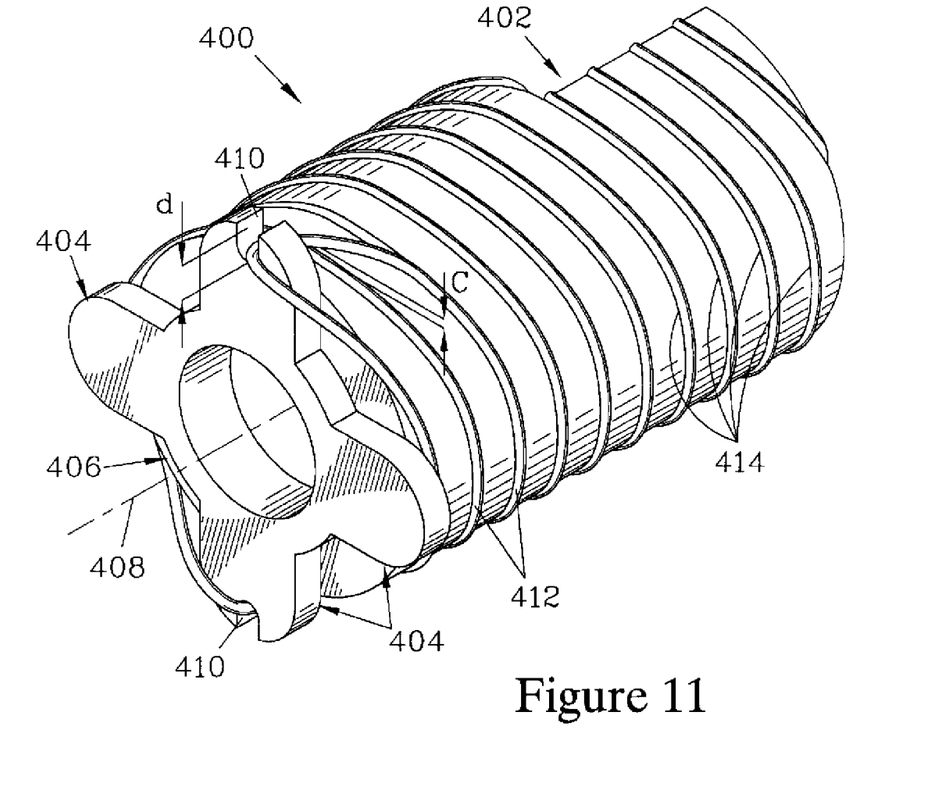

FIG. 11 is a partial isometric view showing a portion of a grip heater 400 which has a tubular insulator 402 that is provided with distal end region lugs 404 that protrude from a distal end region 406 of the tubular insulator 402. The distal end region lugs 404 extend substantially normal to a longitudinal axis 408 of the tubular insulator 402. Similar lugs have been employed in earlier grip heaters to secure the tubular insulator in the grip in the event that adhesion between the tubular insulator and a pliable covering which covers the tubular insulator fails.

The distal end region lugs 404 in this embodiment are provided with indents 410 which serve to transfer two heating elements 412 between grooves 414. The depth d of the indents 410 is maintained in relation to the protrusion of the distal end region lugs 404 from the tubular insulator 402 such that, when one of the heating elements 412 passes over one of the indents 410, it is raised from the tubular insulator 402 to provide a clearance C above the other heating element 412 to prevent contact between the heating elements 412.

While the novel features of the present invention have been described in terms of particular embodiments and preferred applications, it should be appreciated by one skilled in the art that substitution of materials and modification of details obviously can be made without departing from the spirit of the invention.

What is claimed is:

1. A grip heater or a handle, comprising:
   a tubular insulator having a central region terminating in a base end region and a distal end region, said tubular insulator having,
      a first pair of helical recesses terminating in said end regions, said first pair of helical recesses being formed by a first helical groove and a second helical groove which is substantially parallel to said first helical groove, and
      a second pair of helical recesses terminating in said end regions, said second pair of helical recesses being formed by a third helical groove and a fourth helical groove which is substantially parallel to said third helical groove,
         said second pair of helical recesses being interposed between said first pair of helical recesses, and
         said first pair of helical recesses and said second pair of helical recesses being arranged in an overlapping relationship,
   a first heating element residing in said first pair of helical recesses along said central region of said tubular insulator and terminating in a first element first end and a first element second end which are located in close proximity to said base end region of said tubular insulator;
   means for transferring said first heating element from said first helical groove to said second helical groove in close proximity to said distal end region of said tubular insulator;
   a second heating element residing in said second pair of helical recesses along said central region of said tubular insulator and terminating in a second element first end and a second element second end which are located in close proximity to said base end region of said tubular insulator; and
   means for transferring said second heating element from said third helical groove to said fourth helical groove in close proximity to said distal end region of said tubular insulator.

2. The grip heater of claim 1 wherein,
said means for transferring said first heating element includes means for affixing said first heating element with respect to said distal end region, and
said means for transferring said second heating element includes means for affixing said second heating element with respect to said distal end region, and
further wherein the grip heater further comprises:
means for anchoring said first heating element and said second heating element to said base end region of said tubular insulator.

3. The grip heater of claim 2 wherein one of said first element ends and one of said second element ends are joined and attached to a common means for means for anchoring said heating elements to said base end region.

4. The grip heater of claim 1 wherein a region of crossover occurs where said first heating element passes by said second heating element, and
further wherein said means for transferring said first heating element from said first helical groove to said second helical groove further comprises:
at least one first element cross-over protrusion on said tubular insulator positioned in said distal end region, each of said first element cross-over protrusions being configured to restrainably engage said first heating element, and
still further wherein said means for transferring said second heating element from said third helical groove to said fourth helical groove further comprises:
at least one second element cross-over protrusion on said tubular insulator positioned in said distal end region, each of said second element cross-over protrusions being configured to restrainably engage said second heating element,
said at least one first element cross-over protrusion and said at least one second element cross-over protrusion being configured so as to respectively position said first heating element and said second heating element at different radial distances with respect to said tubular insulator at said region of crossover.

5. The grip heater of claim 1 wherein said means for transferring said first heating element from said first helical groove to said second helical groove further comprises:
insulating tape attaching over said first heating element and said tubular insulator, said insulating tape covering a portion of said first heating element so as to allow said second heating element to cross thereover without contacting said first heating element.

6. The grip heater of claim 3 further comprising:
means for isolating said first heating element and said second heating element in a region of crossover.

7. The grip heater of claim 3 wherein said first heating element has a resistance that is different from that of said second heating element.

8. The grip heater of claim 6 wherein said first heating element has a resistance that is different from that of said second heating element.

9. The grip heater of claim 4 wherein each of said at least one first element cross-over protrusions has a notch for restrainably engaging said first heating element, and each of said at least one second element cross-over protrusions has a notch for restrainably engaging said second heating element.

10. The grip heater of claim 4 wherein said at least one first element cross-over protrusion comprises a pair of first element cross-over protrusions, each having a post about which said first heating element can be wrapped so as to restrainably engage said first heating element, and
further wherein said at least one second element crossover protrusion comprises a pair of second element crossover protrusions, each having a post about which said second heating element can be wrapped so as to restrainably engage said second heating element, said second element cross-over protrusions each further comprising:
a pedestal on which said post for said second heating element is mounted.

11. The grip heater of claim 2 wherein said means for means for anchoring said first heating element and said second heating element to said base end region are posts.

12. A heated grip for a handle, comprising:
a tubular insulator that is configured for slipping onto the handle, the tubular insulator having a central region terminating in a base end region and a distal end region, said tubular insulator having,
a first pair of helical recesses terminating in said end regions, said first pair of helical recesses being formed by a first helical groove and a second helical groove which is substantially parallel to said first helical groove, and
a second pair of helical recesses terminating in said end regions, said second pair of helical recesses being formed by a third helical groove and a fourth helical groove which is substantially parallel to said third helical groove,
said second pair of helical recesses being interposed between said first pair of helical recesses, and
said first pair of helical recesses and said second pair of helical recesses being arranged in an overlapping relationship;
a first heating element residing in said first pair of helical recesses along said central region of said tubular insulator and terminating in a first element first end and a first element second end which are located in close proximity to said base end region of said tubular insulator;
means for transferring said first heating element from said first helical groove to said second helical groove in close proximity to said distal end region of said tubular insulator;
a second heating element residing in said second pair of helical recesses along said central region of said tubular insulator and terminating in a second element first end and a second element second end which are located in close proximity to said base end region of said tubular insulator;
means for transferring said second heating element from said third helical groove to said fourth helical groove in close proximity to said distal end region of said tubular insulator; and
a soft grippable material applied over said tubular insulator, said first heating element, and said second heating element.

13. The heated grip of claim 12 wherein,
said means for transferring said first heating element includes means for affixing said first heating element with respect to said distal end region, and
said means for transferring said second heating element includes means for affixing said second heating element with respect to said distal end region, and further wherein the heated grip further comprises:
means for anchoring said first heating element and said second heating element to said base end region of said tubular insulator.

14. The heated grip of claim 12 wherein a region of crossover occurs where said first heating element passes by said second heating element, and
further wherein said means for transferring said first heating element from said first helical groove to said second helical groove further comprises:
at least one first element cross-over protrusion on said tubular insulator positioned in said distal end region, each of said first element cross-over protrusions being configured to restrainably engage said first heating element, and
still further wherein said means for transferring said second heating element from said third helical groove to said fourth helical groove further comprises:
at least one second element cross-over protrusion on said tubular insulator positioned in said distal end region, each of said second element cross-over protrusions being configured to restrainably engage said second heating element,
said at least one first element cross-over protrusion and said at least one second element cross-over protrusion being configured so as to respectively position said first heating element and said second heating element at different radial distances with respect to said tubular insulator at said region of crossover.

15. The heated grip of claim 12 wherein said means for transferring said first heating element from said first helical groove to said second helical groove further comprises:
insulating tape attaching over said first heating element and said tubular insulator, said insulating tape covering a portion of said first heating element so as to allow said second heating element to cross thereover without contacting said first heating element.

16. The heated grip of claim 13 wherein one of said first element ends and one of said second element ends are joined and attached to a common means for anchoring said heating elements to said base end region, the heated grip further comprising:
means for isolating said first heating element and said second heating element in a region of crossover.

17. The heated grip of claim 16 wherein said first heating element has a resistance that is different from that of said second heating element.

18. The heated grip of claim 14 wherein each of said at least one first element cross-over protrusions has a notch for restrainably engaging said first heating element, and each of said at least one second element cross-over protrusions has a notch for restrainably engaging said second heating element.

19. The heated grip of claim 14 wherein said at least one first element cross-over protrusion comprises a pair of first element cross-over protrusions, each having a post about which said first heating element can be wrapped so as to restrainably engage said first heating element, and
further wherein said at least one second element crossover protrusion comprises a pair of second element cross-over protrusions, each having a post about which said second heating element can be wrapped so as to restrainably engage said second heating element, said second element cross-over protrusions each further comprising:
a pedestal on which said post for said second heating element is mounted.

\* \* \* \* \*

UNITED STATES PATENT AND TRADEMARK OFFICE
CERTIFICATE OF CORRECTION

PATENT NO. : 7,091,450 B1 Page 1 of 1
APPLICATION NO. : 10/905941
DATED : August 15, 2006
INVENTOR(S) : James M. Hollander It is certified that error appears in the above-identified patent and that said Letters Patent is hereby corrected as shown below:

In claim 1, column 12 line 29, "grip heater or a handle" should read --grip heater for a handle--.

Signed and Sealed this

Sixteenth Day of December, 2008

JON W. DUDAS
*Director of the United States Patent and Trademark Office*